Jan. 10, 1961
P. G. PRIAROGGIA
2,967,901
CONSTRUCTION OF JOINTS AND SEALING ENDS
OF HIGH TENSION ELECTRIC CABLES
Filed April 21, 1954
5 Sheets-Sheet 1
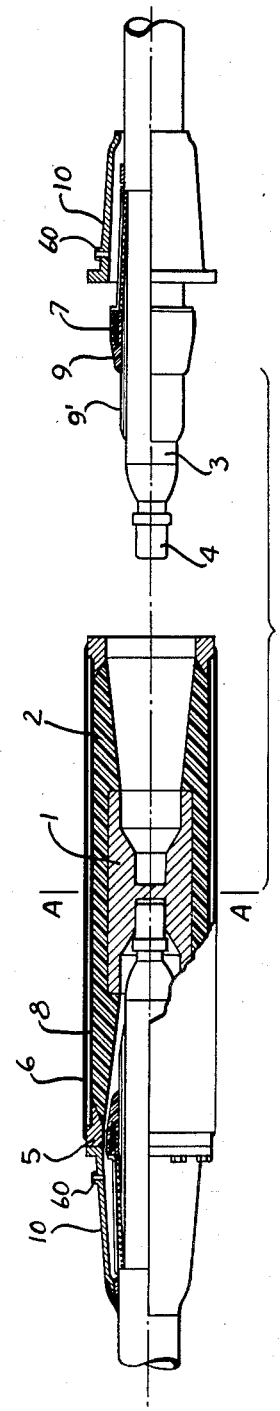
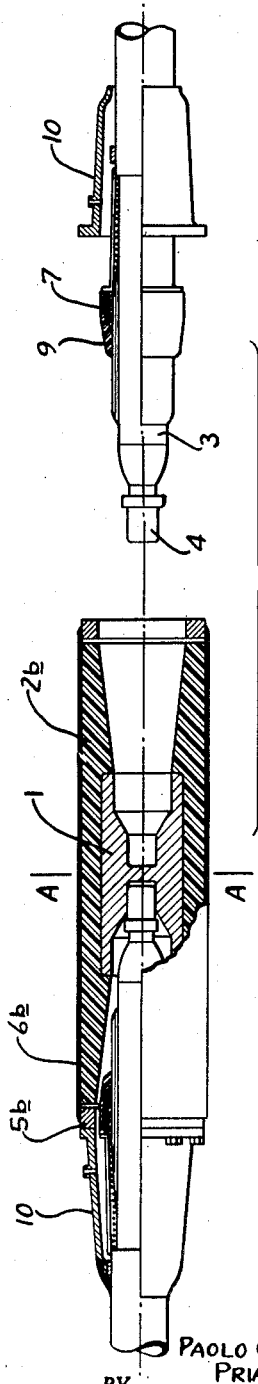
INVENTOR.
PAOLO GAZZANA
PRIAROGGIA
BY
Morris Spector
ATTY.

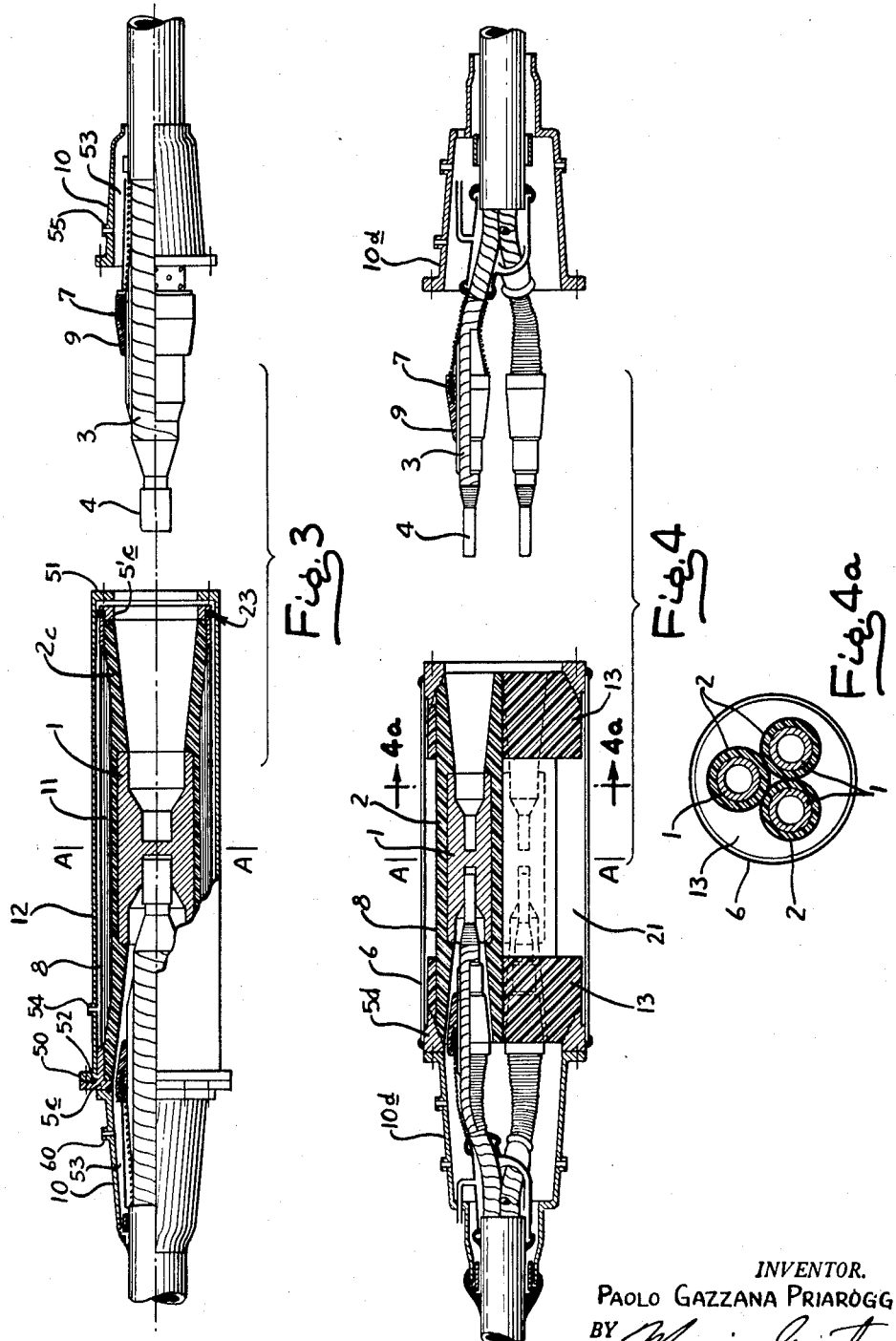

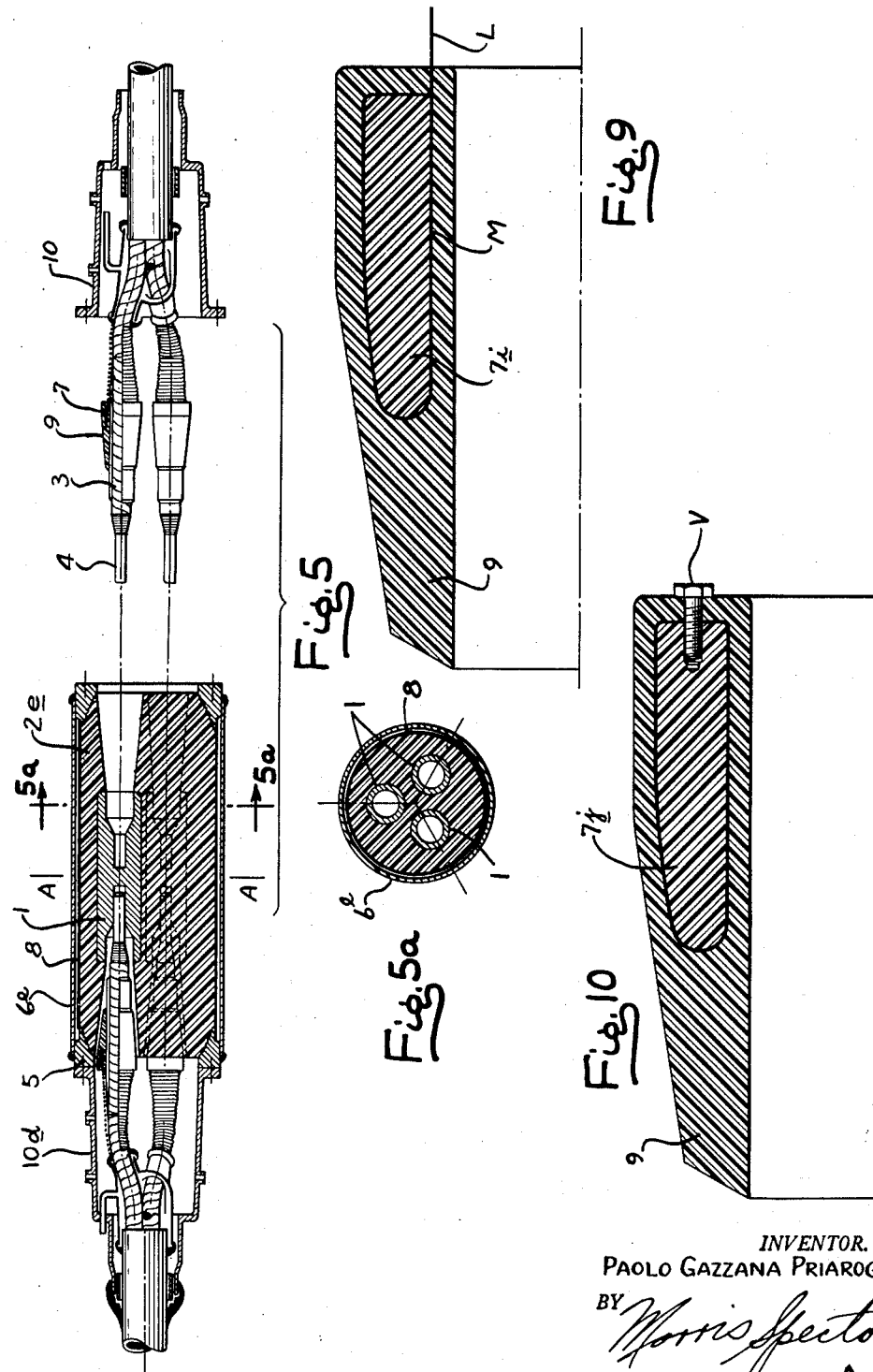

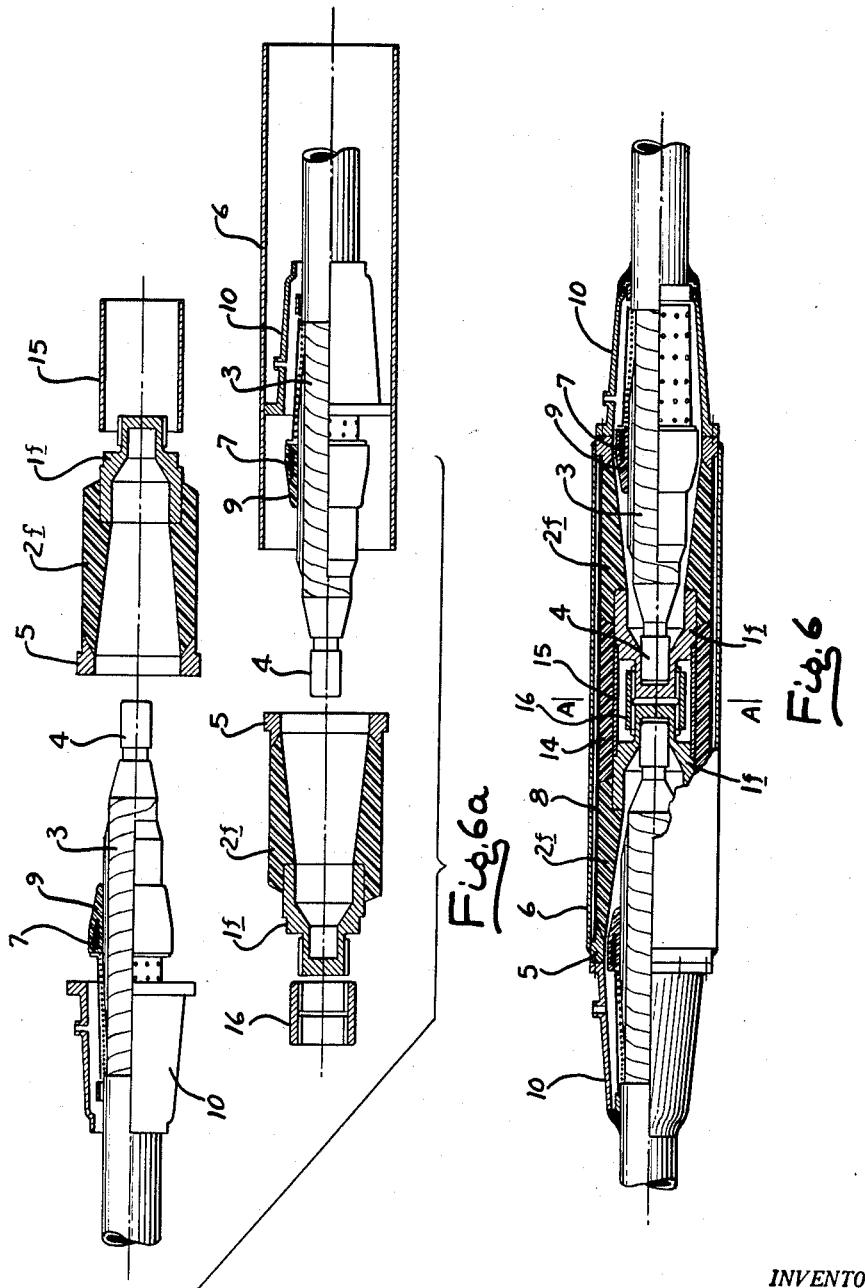

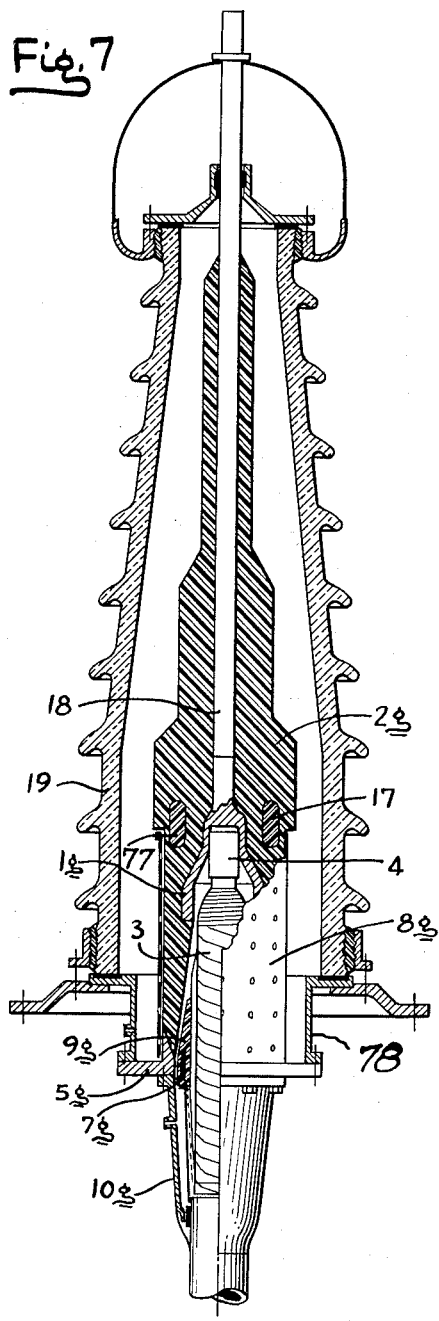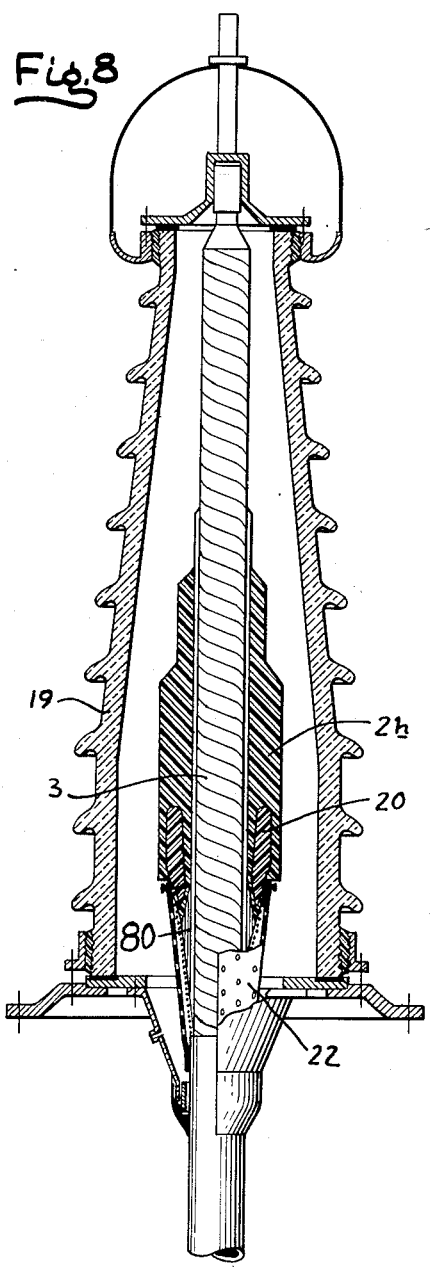

United States Patent Office 2,967,901
Patented Jan. 10, 1961

2,967,901

CONSTRUCTION OF JOINTS AND SEALING ENDS OF HIGH TENSION ELECTRIC CABLES

Paolo Gazzana Priaroggia, Milan, Italy, assignor to Pirelli Societa per Azioni, Milan, Italy Filed Apr. 21, 1954, Ser. No. 424,729

Claims priority, application Italy Apr. 22, 1953

28 Claims. (Cl. 174—73)

This invention relates to joints between high voltage electric cables. The word "joints" is intended to include normal joints, feeding joints and stop joints. In particular, this invention finds its main application in the stop joints and therefore reference in this specification will be mainly to stop joints.

The function of stop joints in high voltage electric cables of the "paper impregnated" type is, as is well known, to maintain the metallic continuity of the conductor or conductors of the cables to be jointed, and to separate the continuity of the fluid which impregnates the cable section on one side of the joint from that on the other side of the joint.

The main characteristic of the stop joint is to provide an obstacle or barrier having the double function of withstanding the pressure differential of the fluids of the two jointed cables and having a dielectric strength sufficient to withstand the electrostatic stresses caused by the electric field in the joint.

The usual obstacle or barrier of the stop joint is made of one or two cylindrical or conical tubes of ceramic materials or of various synthetic resins, or of paper which is impregnated with said resins, which provide a tight seal between the barrel, or socket, and the joint casing.

The joint casing may be subjected to the same fluid pressure existing in one of the two adjacent cable lengths or may be subjected to a pressure different from both, depending upon the type of construction involved.

Although from a theoretical point of view the barrier constructed according to the above mentioned prior system is functionally sufficient by itself, it is, however, employed together with other dielectrics whose functions are to provide the required dielectric strength in the parts of the joint that are subjected to high electric stresses, for instance, those nearer to the joint socket or to other metallic parts not having ground potential.

Owing to the physical characteristics of the materials heretofore used to constitute the barrier it was not possible to obtain a perfect adherence between the barrier and a socket or other metallic parts incorporated therein, and the barriers alone have not been able to withstand the high electrical stresses involved. Therefore, other materials are necessarily introduced to withstand the high electrical stresses.

Such materials may be paper, insulating oil, varnished silk, Bakelite paper, compressed gas, etc.

The tightness of the insulating barrier tube or tubes against the socket and the casing is generally obtained by means of elastic gaskets compressed between the parts in question.

The new type of stop joint of the present invention may be of the prefabricated kind, namely a joint into which are plugged the cable ends provided with contact ferrules. In this case, the connecting socket or sockets is buried in a special solid insulating mass having a very high alternating current dielectric strength (about 600–700 kv. (R.M.S.) per centimeter), very low dielectric loss (tangent delta, ratio of leakage current to capacity current, at 50 cycles of the order of 0.003–0.007), high tensile strength (11,500 pounds per square inch) and the property of perfectly adhering to the metals, or metal coated, or other conducting material buried therein due to a very high adherence strength (of the order of 1400 to 4200 pounds per square inch). This mass acts as a mechanical barrier and at the same time withstands the highest dielectric stresses without requiring other insulating materials (impregnated paper, oil, compressed gases, etc.) due to its particular properties.

The synthetic resins which mainly serve to this purpose are for instance the ethoxylinic ones, in case loaded with inorganic excipients (as for instance quartz, caolin and so on) to which are to be added the proper hardening agents, and preferably those known under the commercial name of "Araldit" or "Araldite" both as casting and bonding resins. Resins of this type show a very low casting shrinkage (of the order of 0.1+2.0 percent by volume).

The main characteristics of this joint is the monolithic structure of the joint insulation.

The hermetic tightness of the barrier is automatically obtained since the synthetic resin adheres, sticking perfectly to the socket and the joint casing, and therefore no elastic gaskets are required for the tightness of the barrier.

It has been already said that in the stop joints heretofore known the mechanical barrier is constituted of a dielectric which does not show, together with good mechanical properties, good electric properties whereby in general it is subtracted, by means of suitable screenings, to very high electric fields leaving to other dielectric materials, devoid of mechanical functions, the task of filling the zones of the electric field where the dielectric stresses are exceedingly high.

On the contrary, in this new type of stop joint, no discrimination exists between the two functions, since the joint electric field is filled, except for the space corresponding to the cable ends, the conductor connector and the other zones of lesser importance, with an insulating material whose mechanical and electrical properties are such as to perfectly accomplish both functions. The metallic parts buried into this insulation serve to obtain the metallic connection of the cable conductors to be jointed and the required distribution of the electric field in the joint.

Reference may now be had more particularly to the drawings.

Fig. 1 is an exploded longitudinal sectional view, in partial elevation, of a single conductor cable stop joint embodying the present invention;

Figs. 2 and 3 are views similar to Fig. 1 and illustrating modified constructions;

Fig. 4 is a view similar to Fig. 1 and illustrating a stop joint for a three conductor cable;

Fig. 4a is a transverse sectional view taken on the line 4a—4a of Fig. 4;

Fig. 5 shows another embodiment of the present invention as applied to a stop joint for a three conductor cable;

Fig. 5a is a transverse sectional view taken along the line 5a—5a of Fig. 5;

Fig. 6 is a longitudinal sectional view, in partial elevation, illustrating still another embodiment of the present invention;

Fig. 6a is an exploded view to illustrate the process of fabrication of the joint of Fig. 6;

Fig. 7 is a longitudinal sectional view, in partial elevation, of still another embodiment of the present invention;

Fig. 8 is a view similar to Fig. 7 and illustrating still another embodiment of the present invention; and Figs. 9 and 10 are enlarged transverse sectional views of one-half of different embodiments of an electrode ring used in the joints of the present invention.

Reference may now be had more particularly to the drawings wherein similar reference numerals designate similar parts throughout, different letter subscripts being added to the reference numerals designating functionally similar but structurally different parts in the various embodiments of the invention.

For greater clearness, the embodiments illustrated in Figs. 1 through 5 illustrate a joint into which a cable end has been inserted at the left side, while the cable end which is to be inserted in the right side is illustrated spaced from the rest of the joint and with the corresponding cap applied.

Fig. 1 shows a stop joint for a single core cable (which may be an oil filled cable, that is, one provided with one or more ducts containing insulating oil under pressure for maintaining the cable impregnated with insulating oil). The stop joint is of the prefabricated type wherein a cylindrical metallic body 1 acts at the same time both as a connecting socket for the cable ends being joined, and as an electric screen for the connection itself, and wherein the metallic body 1 is buried in a dielectric mass 2 made, for instance, of synthetic, ethoxylinic hardened resin. In Figs. 2 through 7 the dielectric mass designated by the reference numeral 2 with an appropriate differentiating subscript corresponds to and is of the same material as the dielectric 2 of Fig. 1. The synthetic resins, preferably those known under the commercial names of "Epoxy," or "Araldit" or "Araldite" both as casting and bonding resins, in this case may be loaded with inorganic excipients, for instance quartz, caolin, etc., to which are to be added the proper hardening agents. Resins of this type show a very low casting shrinkage, of the order of 0.1% to 2.0% by volume. The dielectric 2 has a very high dielectric strength (about 600–700 kv. per centimeter), high tensile strength (about 11,500 pounds per square inch), and the property of perfectly adhering to the metals, or metal coated, or other conducting materials buried therein due to a very high adherence strength (of the order of 1400 to 4200 pounds per square inch). The dielectric 2 has a very low dielectric loss. The dielectric loss, which is referred to as the tangent delta, and which is the ratio of the leakage current to the capacity current is, at 50 cycles, of the order of 0.003 to 0.007.

Various constructions are provided to afford the required tightness between the dielectric 2 and the grounded metallic joint casing 6. Fig. 1 shows one such construction wherein the dielectric 2 is intimately adhered to a metallic ring flange 5 but is not adhered to the joint casing 6 which has a simple protective action. In this type of construction the dielectric 2 is externally shielded, for instance with a layer of conducting varnish 8 perfectly adherent thereto and covering the entire cylindrical surface of the dielectric mass 2 and extending onto the flange 5 which is maintained at ground potential.

A remarkable feature of the joint of the present invention is the provision of a grounded metal stress control ring 7 for each cable half, which stress control ring is buried in an insulating mass 9 having the same nature as that employed to constitute the dielectric 2. Said insulated stress control ring 7 is electrically connected to and terminates the grounding screen of the cable core at the entrance of the core into the joint and eliminates most of the difficult-to-apply insulating hand tapings heretofore required at this place at the cable core. Between the insulation 9 and the insulation of the cable conductor, a sufficient amount of hand wrapped insulation 9' is provided so as to obtain between them a good fitting.

A second alternative is shown in Fig. 2 in which the dielectric 2b is not necessarily adhered to the flange 5b but is adhered to the casing 6b which in this case also acts as an electrostatic shield and is welded to the ring flange 5b.

Within the scope of the present invention fall similar constructions wherein the dielectric 2 is always in intimate contact with the socket 1 but is not stuck either to the casing 6 or to the flanges 5 and the tightness is obtained by means of elastic gaskets. One exemplification of this embodiment of the present invention is illustrated in Fig. 3.

Fig. 3 also illustrates other constructions which fall within the scope of the present invention, in which in order to lighten the dielectric 2c its external surface may have such a shape as to leave a central chamber 11 between it and the flanged casing 12. The central chamber is filled, for instance, with impregnated paper, or insulating oil, or compressed gas, the tightness of which is maintained, for instance, by elastic gaskets. In the embodiment illustrated in Fig. 3, for reasons due to assembling, the casing 12 is provided with asymmetrical flanges 50 and 51 and the tightness of the chamber 11, during its filling, under vacuum, with an insulating fluid, is maintained at the left side through a gasket 52 interposed between the plane flange 50 of the casing 12 and the plane flange of an interposed ring member 5c, and at the right hand side through a packing 23 of the O-ring type between the casing 12 and a metallic ring 5'c which permits the carrying out of separately filling of the chamber 11 and the lateral chamber 53 at the right hand side. In this case, when the filling is accomplished, the chamber 11 will be connected with the lateral chamber 53 by means of a connecting tube through nipples 54 and 55.

Fig. 4 shows a stop joint for a three-core cable. This joint results from the assembling of three shielded single core joints of the same type as illustrated in Fig. 1, wherein the mechanical barrier constituting the dielectric mass 2 is completed by auxiliary masses 13 which are in intimate contact with the ring flange 5d that corresponds to the ring flange 5 of Fig. 1. The masses 13 partially fill the space included between the three single core joints and the casing 6, said masses 13 having no electrical function, but only mechanical ones. These masses 13 may be of the same material as the dielectric masses 2 and they surround the conductive varnish 8 on each one of the cable cores, which varnish 8 is in contact with the ring flange 5d.

The inner space 21, included between the masses 13, may be left empty or may be filled with any means, not necessarily insulating, since the single joints are shielded with shields 8 obtained, for instance, by a conductive varnish.

Fig. 5 shows a three-core prefabricated stop joint similar to that of Fig. 4 but differing therefrom essentially in that a single dielectric mass 2e is provided wherein are buried the three connecting sockets 1 of the respective cable conductors. This mass 2e is provided with six lateral chambers, three on each side, and has the metallic flange rings 5 firmly united thereto. The six chambers are provided in order to allow the introduction of the ends 3 of each of the cable cores, the conductor of each cable core being provided with a contact ferrule or plug 4 that fits into and makes intimate electric contact with the corresponding metallic socket 1.

The outer metallic casing of the joint may have a protective function and no electric function, as in the case of the casing 6e of Fig. 5, or it may have a protective function and, in addition, serve as an electric screen or shield as in the case of Fig. 2, in which event the conductive varnish 8 would be omitted and the casing 6 would be in close contact with the body 2e as is the casing 6b of Fig. 2.

Prefabricated joints, such as shown in Figs. 1 through 5, can be imagined as cut along primary axis A—A into two parts which are mirror images with respect to each other. Stop joints are thus obtained consisting of two halves to be joined and sealed to each other on the installation site. This arrangement is illustrated in Figs. 6 and 6a, to which reference may be had.

For this purpose the metal body 1 heretofore used may be assumed to consist of two separate parts each of which is designated by the reference numeral 1f, each one of which metallic bodies 1f is joined to a mass 2f of insulation, corresponding to the insulation 2 of Fig. 1, to the opposite end of which insulation is joined the metallic flange ring 5. The stop joints on the installation are then made by inserting the prepared cable ends each of which has a ferrule 4 electrically and mechanically secured to the bared conductor ends, into their corresponding half joints. The two half joints are then drawn together by connecting the metallic parts 1f in any desired manner as, for instance, by means of a threaded ring 16 into which both metallic parts 1f are drawn, a metallic sleeve 15 which acts as a shield, being provided across the free space between the metallic body 1f—1f. A synthetic resin 14 of the same nature as that of the mass 2 and the masses 2f is then poured into the free space between the masses 2f—2f of the two half joints between the shield 15 and the casing 6. After the synthetic resin 14 has hardened, its perfect adhesion with the dielectric masses 2f—2f and with the shield 15 produces a monolithic unit perfectly similar to that of Fig. 1. This construction may be important in those cases in which space limitations make it impossible to use stop joints of the prefabricated type as, for instance, in underground vaults of a length insufficient to allow the insertion of the cable end in a complete prefabricated stop joint.

All of the above described modifications which can be applied to single core stop joints, for instance, that of Fig. 3 which illustrates a central chamber 11 wherein is contained another dielectric different from the synthetic resin forming the mass 2, and that shown in Fig. 6 wherein the single core joint is assembled on the installation place by pouring the synthetic resin, may be embodied on the multi-core cable joint.

Furthermore, by providing suitable perforation of the central metallic block 1 which separates the two chambers of the joint so that both cable receiving sockets of the block 1 are in communication, the fluids or ducts on the two sides of the joint may be put into communication. When this is done, the joint ceases to be a stop joint, but this construction may in some cases, particularly for joints of three-core cables, find economical application in place of the usual hand made joints and of the feeding joints.

Normal joints, or feeding joints wherein there is communication of liquid flow from one side of the joint to the other, prefrabricated or to be assembled at the installation site, for single conductor or multi-conductor high voltage cables, similar to those illustrated in Figs. 1–6, may therefore be constructed in accordance with the teachings herein, with the only modification that by any means the flow of insulating fluid is allowed from one to the other terminal chambers of the joint. This may be accomplished, for instance, by providing a connecting tube joining the nipple 60 of the cap 10 on one side of the joint with the corresponding nipple on the corresponding cap on the other side of the joint.

Another important application of the principles of the invention illustrated in Figs. 1 and 2 is shown in Fig. 7 which illustrates a construction derived from a prefabricated stop joint for a single conductor cable, which construction has been modified and rendered asymmetrical in order to be coupled to a sealing structure, sometimes referred to as a "terminator" or a "pothead," which is employed with high fluid pressure cables. The structure of Fig. 7 provides a very simple means for the manufacture of a sealing terminal structure suitable to withstand high pressures, since it completely relieves the external porcelain insulator 19 from the pressure of the cable fluid. The external porcelain 19 is therefore not necessary from a functional point of view since the inner monolithic body could itself perform the function of an external insulator, as might happen, for instance, in case of a cable entering a transformer.

In Fig. 7, 1g represents a shielding electric socket constituting an electric connector for making contact with the ferrule 4 at the end of the cable conductor. (Either in this construction or in the preceding ones the ferrule may comprise contact elastic elements, such as spring pressed contact members, or the contact elastic elements may be placed in the screening socket that receives the ferrule.) The ferrule 1g and conducting rod 18 are embedded in a mass of insulation 2g which is the same material as the insulation 2 of Fig. 1, previously described. In the same insulating mass 2g there is, in this case, also buried a metal stress control ring 17 which is externally grounded by means of one or more bolts 77 which extend out of the insulating mass and are in contact with a grounded metal screen 8g. The screen 8g need not be adhered to the insulating mass 2g if the external porcelain insulator 19 is filled with oil under vacuum; in this case, it is suitably perforated, as indicated in Fig. 7. When, on the contrary, the external insulator 19 is not filled with oil under vacuum, the shielding screen 8g should be closely contacting the insulating mass 2g and may be imperforate. The remaining parts of this joint are similar to those of the joints illustrated in the preceding figures. In this instance, 5g is the bottom flange, 7g is the metallic stress control ring buried in the insulating mass 9g which serves to terminate the grounded metallic screen on the core of the cable 3 at the entrance of the joint, and 10g is the metallic closing cap inserted over the cable end and bolted to the bottom flange 5g, which in turn is bolted to a metal tube 78 to which the insulator 19 is suitably clamped.

In all of the above indicated constructions, the passage of insulating fluid from the possible feeding conduits either located within the respective cable conductors or external thereof, namely in the fillers included between the cable conductors, to the external reservoirs may be carried out according to the various methods usually known in the art of making high voltage cable stop joints, by employing all the devices that said method provides in the construction of the ferrules at the end of the conductor, and of the socket.

The metallic stress control ring 17 buried in the insulating mass 2, described as an improvement in the above construction, has an interesting application in the case of single conductor terminals, those, for instance, which do not have to withstand very high internal pressure. This is illustrated in Fig. 8.

Fig. 8 shows a low pressure terminal wherein onto the core 3 of the cable is inserted a sleeve consisting of a conducting stress control ring 20 to be grounded (for instance, by means of a perforated bell-shaped metallic screen 22). The ring 20 is buried in an insulating mass 2h of the same material as the mass 2 and having the above designated special properties made, for instance, with ethoxylinic resins, in some cases loaded with inorganic excipients, and suitably hardened. Said constructions eliminate almost completely the need for the application onto the cable core of paper tubes or insulating tapings combined with stress control screens which are normally used in the sealing ends of high voltage cables.

The insulation 80 applied by hand during the assembly is thus reduced to a minimum amount required for fitting the above said sleeve 2h to the cable end. In this sleeve may be buried some insulating metal electrodes (not shown in the drawing) so that the sleeve 2h may act as a condenser cone having nevertheless the characteristic, in comparison with the usual construction, that its dielectric shows the particular features which have been mentioned above, for instance, that it is constituted of synthetic resins of the ethoxylinic type, preferably of those known under the trade name of "Araldit" or "Araldite," and that it is preferably adhered to the electrodes thus providing, therefore, all the advantages mentioned above.

The special dielectric (solid masses 2, and 2 with the various subscripts, and 9 and 13) of the embodiments heretofore described are constituted of the resins belonging to the group "Epoxy" or "Epoxide" resins, which include all of the resins based on ethylene oxide or its homologues or derivatives. They are marketed under trade names as, for instance: "Araldit," or "Araldite," produced by Ciba Co., Inc. of New York; "Epon" or "Epikote," produced by Shell Chemical Corp. of New York; "Devran" produced by Devoe & Raynolds Co., Inc., of Louisville; "C–8" produced by Bakelite Co. of New York.

The above resins are in fact employed for a number of reasons, amongst which may be mentioned their characteristic of adhering to the surface of the metallic parts buried within them during their setting process, with adhesion forces having exceptionally high values in the construction above described, namely:

(1) In normal, feeding and stop joints, either prefabricated or to be assembled on the installation place, for high tension single- or multi-core electric cables;

(2) In prefabricated stop joints which are modified in order to be coupled to a sealing end particularly suitable for cables at high insulating fluid pressure; and (3) In sealing ends for high tension single-core electric cables particularly at low insulating fluid pressure.

The above-mentioned metallic parts or the electric armors or shields buried into the resins may be differentiated as follows:

(1) Parts at ground potential or at a potential different from this, having the only purpose of obtaining the required distribution of the electric field inside the joint or the sealing end, as, for instance, the stress-control rings which terminate the screening of the cable cores at their entrance into the joints and the other electric armors in case provided;

(2) Parts the function of which is different from the above one, being for instance mechanical or that of conveying the electric current, or also having other functions besides that indicated at 1. They are, for instance, the socket of any joint and the metal rod connected to it in stop joints coupled to a sealing end.

The following may be mentioned with respect to the metallic parts included in the first group above. It has been ascertained that even loading the above said synthetic resins with inorganic excipients (as, for instance, porcelain or quartz powder) at a very high rate, that is, 300–400%, it has never been possible to give said resins a coefficient of linear thermal expansion preferably equal to that of the metallic parts buried into them.

As an example, this coefficient is $30 \times 10^{-6}$ for the loaded resins whilst it is $16 \times 10^{-6}$ for the copper, the first one being approximately double of the second one.

The influence of the coefficient of linear thermal expansion is remarkable since the dangerous inner mechanical stresses which may occur in service owing to temperature variations are depending upon it.

Said inner mechanical stresses are superposed to those due to the shrinkage of the resins in consequence of the polymerization and may increase them; jointly said stresses, under particular conditions, may even cause cracking in pieces of large sizes.

I have found it possible to avoid the mechanical inner stresses due to variations of temperature by substituting the metallic parts having the sole function of electric screen or shield, namely the purpose of suitably controlling the electric field, by non-metallic parts having same shape and sizes, constituted of same synthetic resins which form the special solid dielectric of the joints and of the sealing ends, or made of other similar resins having the same coefficient of linear thermal expansion as the preceding ones, but made conductive at their surface by means of any procedure already known in the art, as for instance, by spray metallization with tin, copper, silver, etc., or by graphitization or by coating with varnishes based on a conductive carbon black.

As another embodiment of the present invention, it is possible to replace the metallic parts that are used for electric field control purposes as distinguished from the purpose of carrying the main current, in the structures heretofore described, with non-metallic parts having the same shape and size and formed of the same synthetic resins which form the special solid dielectric of the joint or of the sealing ends, or made of other similar resins having the same thermal coefficient of linear expansion as the preceding ones but made conductive in their mass. This result may be obtained by uniformly dispersing in the above resins for instance, some conductive powder, preferably conductive carbon black, at rates sufficiently low so as not to modify in any marked way the thermal cofficient of linear expansion of said resins. The conductive powder may be for instance, in an amount of 8 to 10% by weight with respect to the total weight of the compound needed for manufacturing the above electrodes. In accordance with the present invention, the required electrode may be prefabricated and then buried in the solid dielectric as if they were completely metallic as by molding the dielectric around it.

The remarkable advantage of having a greater uniformity in the thermal expansion of the dielectric as well as the therein buried electrodes is thus obtained.

As an example, and without limiting the field of the present invention, Figs. 9 and 10 illustrate two different forms of stress control rings which terminate the grounded shield of the cable core at the end of the joint as used in Figs. 1 through 8.

Fig. 9 shows one-half cross section of the electrode. The electrode in this case corresponds to the electrode 7 of Fig. 1 or the corresponding electrodes of the different figures. In this case the electrode constitutes a ring 7i of a solid dielectric based on a synthetic resin of the above said type, as, for instance, that known under the trade name of "Araldit" or "Araldite," the surface of said ring being made conductive by a film of metal M and being grounded by means of one or more contact strips L soldered to the metal film. The sealing ring with its metalized coating end is buried in the insulation solid mass 9 made of the same synthetic resin as that of the ring 7i.

Fig. 10 is similar to that of Fig. 9 except that the ring 7j which corresponds to the ring 7i and is also made of a synthetic resin belonging to the above-mentioned type, as, for instance, that known under the trade name of "Araldit" or "Araldite," which has been made conductive by incorporating in its mass a suitable amount of carbon black (8% to 10% by weight). The ring 7j may be connected to ground by means of a contact screw or screws V, the ring being buried in the solid insulating mass 9 constituted of a synthetic resin of the ethoxylinic type, as stated above, which may be "Araldit" or "Araldite."

Electrodes or electrostatic shields constructed as described in connection with Figs. 9 and 10 may be used in lieu of the solid metal electrodes 7 of Figs. 1 through 6. Likewise, the stress control ring 17 of Fig. 7 or the stress control ring 20 of Fig. 8 may be constructed in the manner of the teachings of the construction of the ring 7i of Fig. 9 or 7j of Fig. 10.

For simplicity's sake, in the following claims the words "electric armors" means the metal parts having ground potential or a potential different from ground characterized in that their surface constitutes totally or partially a peripheral portion of the electric field of the accessory, joint, or terminal, for high tension electric cables.

In the said denomination are therefore included the electrodes having the purpose of carrying out a required distribution of the electric field as well as metallic parts having different functions (as for instance, to convey the electric current, or mechanical functions), which are facing the dielectric of the accessory so that their surface is totally or partly the seat of electrostatic stresses.

What I consider new and desire to secure by Letters Patent is:

1. A prefabricated terminating and joint structure for a high voltage cable including a conductor and solid insulation surrounding the same, and carrying an insulating fluid, said structure having a homogenous solid dielectric mass of material that is impervious to the insulating fluid and is in the shape of an imperforate sleeve adapted to be slipped into a position to surround the cable core and capable of withstanding high dielectric stresses and spaced from the cable conductor and from the solid cable insulation, a casing surrounding said dielectric mass, the casing having a peripherally extending internal casing flange, a portion of said mass of dielectric material being in close contact with said flange around the entire periphery of the flange and sealed thereto to eliminate any space between the dielectric mass and the flange to produce a fluid-tight joint, and the remainder of said dielectric mass being spaced from said casing and covered with a conductive material.

2. In combination with a high voltage metal sheathed electric cable having a core that includes a conductor surrounded by solid insulation, and wherein the sheath is terminated short of the end of the core that then extends beyond the sheath, a prefabricated structure movable into position on the extended end of the core of the cable in situ, said structure having a sleeve of a solid dielectric composition capable of withstanding high electric stresses and adapted to surround the cable end and having a longitudinally extending sleeve opening of a size greater than the cross section of the core to permit sliding of the sleeve on to the core, a grounded annular electrode coaxial with the sleeve and buried in said solid dielectric composition and acting as a stress control ring, said dielectric adhering to the electrode at the entire interfaces between them to eliminate all empty spaces which may be subject to electric stress between them, the entire sleeve being spaced axially from the end of the cable core and with the cable conductor extending through and beyond the sleeve, said dielectric and said stress control ring having substantially the same thermal coefficients of expansion.

3. An accessory for a high voltage electric cable comprising an electrode buried in a dielectric mass formed of a synthetic resin, said electrode being formed of a body of synthetic resin material having a similar coefficient of linear thermal expansion as said first-mentioned dielectric mass, and conductive particles dispersed throughout said resinous electrode body.

4. An accessory for a high voltage electric cable comprising an electrode buried in a dielectric mass, and the surface of the electrode being electrically conductive and the main body thereof being made of a dielectric material having similar thermal expansive characteristics as said dielectric mass in which the electrode is buried.

5. An accessory for a high voltage electric cable comprising an electrode buried in a dielectric mass, said electrode having a body of dielectric material having a similar coefficient of linear thermal expansion as said first-mentioned dielectric mass, and conductive particles dispersed throughout said electrode body in such amounts as to render the body conductive without markedly affecting the overall coefficient of thermal expansion of the electrode body.

6. A high voltage structure for surrounding the end of a high voltage cable that includes a conductive sheath within which is located a core that includes a conductor and solid cable insulation surrounding the same where the sheath is terminated short of the end of the cable core which then extends beyond the sheath, said structure having a single monolithic body having a longitudinally extending opening into which the cable core extends so that the body surrounds the cable core adjacent its point of entry into said structure and said structure including a mass of solid dielectric material spaced from the conductor and from the cable insulation and surrounding the cable insulation and a stress control ring buried and closely enveloped within said dielectric material in continuous contact therewith along their interfaces, said dielectric material including a synthetic resin of the ethoxylinic type possessing high dielectric strength, low dielectric loss characteristics and high adhering qualities with the material out of which said stress control ring is made and having substantially the same thermal coefficient of expansion as the material of said stress control ring, and means for providing a grounding connection to said ring.

7. In combination with a high voltage cable that includes a conductive sheath within which is located a core that includes a conductor surrounded by solid insulation impregnated with an insulating fluid, a joint extending electrical connections with the conductor, characterized in that the joint includes a rigid casing secured to the sheath and within said casing there is a prefabricated monolithic block comprising a sleeve of homogeneous solid insulation wherein there is embedded a metallic connector and there is complete continuity of contact of the facing surfaces of the connector and the block, said prefabricated monolithic sleeve with its embedded connector being adapted to receive the end of the high voltage cable conductor by a movement of the conductor axially into the sleeve, said conductor being mechanically and electrically jointed with said connector, the sleeve having an axially extending conductor receiving opening which is over-sized with respect to the size of the conductor core including its solid insulation by an amount at least sufficient to permit sliding of the sleeve into position on the core, said conductor core extending into the opening along the longitudinal axis thereof, the oversized opening being of a length to receive the radially outermost portion of the solid insulating covering of the conductor whereby said insulating sleeve surrounds said solid insulation that covers the conductor, said connector including a conductive part which surrounds the end of the solid insulation that covers the conductor.

8. A joint as defined in claim 7 characterized in that the sleeve is a synthetic resin of the ethoxylinic type with hardening agents.

9. A joint as defined in claim 8 wherein the synthetic resin is loaded with inorganic excipients.

10. A joint such as is defined in claim 7 characterized in that the casing is metallic and the monolithic block within the casing is adhered thereto along the entire area of its outer surface.

11. A structure such as defined in claim 7 characterized in that the external surface of the prefabricated monolithic block is metallized.

12. In combination with a high voltage electric cable having a sheath and a core comprising a cable conductor covered with solid insulation, means for forming a conductive joint between another conductor and the cable conductor, said means including an electrical screen comprising an annular conducting element embedded in a sleeve of insulating material having substantially the same thermal coefficient of expansion as the conducting element and to which it is adhered continuously along the entire interface between the sleeve and the conducting element, said screen surrounding the cable core and being insulated from the jointed conductors, and being displaced axially with respect to the electrical joining point of the cable conductor with the other conductor, the sleeve with its embedded screen comprising a unitary assembly separate from the cable core and having sufficient clearance with respect thereto to be slidable thereon to the desired position, the cable core extending through the sleeve, and the end of the cable conductor terminating past one end of the sleeve and the cable sheath terminating short of the other end of the sleeve, and means for grounding the screen.

13. An electric screen as set forth in claim 12 characterized in that the sleeve of thermosetting insulation is constituted of synthetic resins of the ethoxylinic type with hardening agents added.

14. An electric screen as set forth in claim 12 characterized in that the sleeve of thermosetting insulation is constituted of synthetic resins of the ethoxylinic type with hardening agents added and loaded with inorganic excipients.

15. A structure for establishing connections with a high voltage electrical conductor which is provided with a solid insulating covering, said structure being a prefabricated article of manufacture and comprising a metallic connector having a bore to receive the conductor and with the wall of the bore making electrical and mechanical connections with the conductor, said connector having a conductive hood centered on the same center as the bore and of larger diameter than the bore and adapted to surround the conductor insulation, and a monolithic block of insulation within which the connector is embedded with complete continuity of contact of the connector with the block on the entire area of the surface of the block that faces the connector, said block having a bore of progressively diminishing diameter centered on said same center and extending from the end of the block to the hood of the connector and with the insulation of the block overlying the end of the hood so that the insulation on the inner surface of the bore of the block constitutes a continuation of the inner surface of the hood and merges therewith.

16. In combination with a high voltage electric cable having a conductor covered with solid insulation, means for establishing electrical connections with the conductor comprising a metallic connector having a bore into which the conductor extends and with which the end of the conductor makes electrical and mechanical connection, said connector having a conductive hood centered on the same center as the bore and of a larger diameter than the bore, the insulation on the cable conductor adjacent to the end thereof extending into the hood and being surrounded thereby, and a monolithic block of insulation within which the connector is embedded with complete continuity of contact of the connector with the block on the entire area of that surface of the block that faces the connector, said block having a bore of progressively diminishing diameter extending from the end of the block to the hood and with the inner surface of the bore constituting a continuation of the inner surface of the hood and free of sharp corners at the junction between the bore surface of the block and the inner surface of the hood, the cable insulation extending into said bore.

17. A joint between high voltage electrical conductors at least one of which is provided with a solid insulating covering and is part of a cable having a conductive sheath, characterized in that the joint includes a rigid casing and within said casing there is a prefabricated monolithic block comprising a sleeve of homogeneous solid insulation wherein there is embedded a metallic connector and there is complete continuity of contact of the facing surfaces of the connector and the block, said prefabricated monolithic sleeeve with its embedded connector being adapted to receive the ends of the high voltage conductors by a movement of the conductors axially into the sleeve from opposite ends thereof, said conductors being mechanically and electrically jointed with said connector, the sleeve having an axially extending conductor receiving opening which is oversized with respect to the size of the conductors and the solid insulation, said cable being fluid filled and the joint being provided with a structure through which the cable conductor extends and which structure forms a part of the fluid conduit of the cable and which structure terminates in a lateral flange, said prefabricated monolithic block being impervious to the fluid of the cable and being adhered to the lateral flange in fluid-tight sealing relation thereto along the entire areas of their interface around the entire periphery of the cable.

18. A joint between high voltage electrical conductors at least one of which is provided with a solid insulating covering and is part of a cable having a conductive sheath, characterized in that the joint includes a rigid casing and within said casing there is a prefabricated monolithic block comprising a sleeve of homogeneous solid insulation wherein there is embedded a metallic connector and there is complete continuity of contact of the facing surfaces of the connector and the block, said prefabricated monolithic sleeve with its embedded connector being adapted to receive the ends of the high voltage conductors by a movement of the conductors axially into the sleeve from the opposite ends thereof, said conductors being mechanically and electrically jointed with said connector, the sleeve having an axially extending conductor receiving opening which is oversized with respect to the size of the conductors and the solid insulation, the metallic connector including screening means comprising conductive parts embedded in the sleeve and surrounding the solid insulation on the cable conductor, said sleeve overhanging the ends of the conductive parts.

19. A joint between high voltage electrical conductors at least one of which is provided with a solid insulating covering and is part of a cable having a conductive sheath, characterized in that the joint includes a rigid casing and within said casing there is a prefabricated monolithic block comprising a sleeve of homogeneous solid insulation wherein there is embedded a metallic connector and there is complete continuity of contact of the facing surfaces of the connector and the block, said prefabricated monolithic sleeve with its embedded connector being adapted to receive the ends of the high voltage conductors by a movement of the conductors axially into the sleeve from the opposite ends thereof, said conductors being mechanically and electrically jointed with said connector, the sleeve having an axially extending conductor receiving opening which is oversized with respect to the size of the conductors and the solid insulation, the cable being an insulating fluid filled cable, and the monolithic block being impervious to the fluid, and elastic gaskets interposed between the monolithic block and the joint casing for stopping the cable insulating fluid at the joint.

20. A structure for extending electrical connections with a conductor of a high voltage conductively sheathed fluid filled cable wherein the cable core includes solid insulation around the conductor characterized in that the structure includes a prefabricated monolithic block comprising a sleeve of homogeneous solid insulation wherein there is embedded a metallic connector and there is complete continuity of contact of the facing surfaces of the connector and the block, at least one end of said prefabricated monolithic sleeve with its embedded connector being adapted to receive the end of the high voltage cable conductor by movement of the conductor axially into the sleeve from the one end thereof, said conductor being mechanically and electrically jointed with the connector, the sleeve having an axially extending conductor receiving opening which is oversized with respect to the size of the cable conductor and its solid insulation, the metal connector including screening means comprising conductive parts embedded in the sleeve and surrounding the solid insulation of the cable conductor, the sleeve overhanging the end of the conductive parts.

21. A joint as defined in claim 20 wherein the prefabricated monolithic block is adapted for movement into position surrounding the end of the core of the cable in situ and there is provided a grounded annular electrode coaxial with the sleeve and buried in a dielectric mass and acting as a stress control ring, said dielectric adhering to the electrode at the entire interface between them to eliminate all empty spaces between them which may be subject to electric stress.

22. A structure for extending electrical connections with a conductor of a high voltage conductively sheathed fluid filled cable wherein the cable core includes solid insulation around the conductor characterized in that the structure includes a prefabricated monolithic block comprising a sleeve of homogeneous solid insulation wherein there is embedded a metallic connector and there is complete continuity of contact of the facing surfaces of the connector and the block, at least one end of said prefabricated monolithic sleeve with its embedded connector being adapted to receive the end of the high voltage cable conductor by movement of the conductor axially into the sleeve from the end thereof, said conductor being mechanically and electrically jointed with the connector, the sleeve having an axially extending conductor receiving opening which is oversized with respect to the size of the cable conductor and its solid insulation, and an annular conducting element embedded in a second sleeve of insulating material, a casing housing both sleeves and having an opening for receiving the cable core, said second sleeve also surrounding the cable core and being located at the entrance of the core into said casing, and means electrically connecting said annular conducting element with said sheath.

23. A structure for extending electrical connections with a conductor of a high voltage conductively sheathed fluid filled cable wherein the cable core includes solid insulation around the conductor characterized in that the structure includes a prefabricated monolithic block comprising a sleeve of homogeneous solid insulation wherein there is embedded a metallic connector and there is complete continuity of contact of the facing surfaces of the connector and the block, at least one end of said prefabricated monolithic sleeve with its embedded connector being adapted to receive the end of the high voltage cable conductor by movement of the conductor axially into the sleeve from the end thereof, said conductor being mechanically and electrically jointed with the connector, and an annular conducting element embedded in a second sleeve of insulating material, a casing housing both sleeves and having an opening for receiving the cable core, said second sleeve also surrounding the cable core and being located at the entrance of the core into said casing, and means electrically connecting said annular conducting element with said sheath.

24. In combination with a high voltage conductively sheathed cable wherein the cable core extends beyond the sheath and includes solid insulation around the cable conductor, a rigid casing mechanically secured with respect to the sheath and in fluid-tight relation thereto and into which the cable core enters and through which the circuit of the cable conductor extends, a preformed monolithic block of synthetic epoxy insulation within the casing and having an opening into which the insulated core extends and which opening is oversized with respect to the insulated core so that the preformed block of insulation can be assembled on the core by an axial sliding movement thereon, a grounded conducting stress control ring buried in said block and concentric with said opening, said stress control ring lying entirely between the end of said sheath and the extended end of the cable core, the cable conductor extending lengthwise from the sheath beyond the axial extent of the stress control ring in the block.

25. A structure as defined in claim 24 wherein there is an electrical connector embedded in a mass of epoxy resin insulation within the casing, said connector terminating the end of the cable conductor for extending circuit connections therewith and said connector being coaxial with said stress control ring.

26. A joint structure extending electrical connections between the conductors of high voltage conductively sheathed fluid filled cables wherein each cable core includes solid insulation around the conductor, characterized in that the structure includes a prefabricated monolithic block comprising a sleeve of homogeneous solid insulation wherein there is embedded a metallic connector and there is complete continuity of contact of the facing surfaces of the connector and the block, each end of said prefabricated monolithic sleeve with its embedded connector being adapted to receive the end of a high voltage cable conductor by movement of the conductor axially into the sleeve from the one end thereof, each conductor being mechanically and electrically jointed with the connector, the sleeve having an axially extending conductor receiving opening which is oversized with respect to the size of the cable conductor and its solid insulation, the metal connector including screening means comprising conductive parts embedded in the sleeve and surrounding the solid insulation of the cable conductor, the sleeve overhanging the ends of the conductive parts.

27. A structure such as defined in claim 26 wherein there is provided means for forming a passageway for the flow of insulating fluid between the joined cables.

28. A joint between high voltage electrical conductors at least one of which is provided with a solid insulating covering and is part of a cable having a conductive sheath, characterized in that the joint includes a rigid casing and within said casing there is a prefabricated monolithic block comprising a sleeve of homogeneous solid insulation wherein there is embedded a metallic connector and there is complete continuity of contact of the facing surfaces of the connector and the block, said prefabricated monolithic sleeve with its embedded connector being adapted to receive the end of a high voltage conductor by a movement of the conductor axially into the sleeve, said conductor being mechanically and electrically jointed with said connector, the sleeve having an axially extending conductor receiving opening which is oversized with respect to the size of the conductor and solid insulation, the metallic connector including screening means comprising conductive parts embedded in the sleeve and surrounding the solid insulation on the cable conductor, said sleeve overhanging the ends of the conductive parts.

References Cited in the file of this patent

UNITED STATES PATENTS

| | | |
|---|---|---|
| 1,563,946 | Atkinson | Dec. 1, 1925 |
| 1,583,766 | Atkinson | May 4, 1926 |
| 1,628,438 | Simons | May 10, 1927 |
| 1,988,279 | Kirch | Jan. 15, 1935 |
| 2,007,357 | Anderson et al. | July 9, 1935 |
| 2,209,894 | Scott | July 30, 1940 |
| 2,282,003 | Scott | May 5, 1942 |
| 2,395,886 | Lee | Mar. 5, 1946 |
| 2,540,909 | Pouzet | Feb. 6, 1951 |
| 2,668,157 | Emig et al. | Feb. 2, 1954 |
| 2,779,006 | Albersheim | Jan. 22, 1957 |
| 2,785,319 | Simpson | Mar. 12, 1957 |
| 2,826,630 | Klebanoff et al. | Mar. 11, 1958 |

FOREIGN PATENTS

| | | |
|---|---|---|
| 550,503 | Great Britain | Jan. 12, 1943 |

OTHER REFERENCES

Ethoxylines, "Modern Plastics," November 1950, pages 85–88.